Oct. 29, 1963     D. H. ZIPPER     3,108,682
GLASS JAR GRIPPERS
Filed Feb. 16, 1961
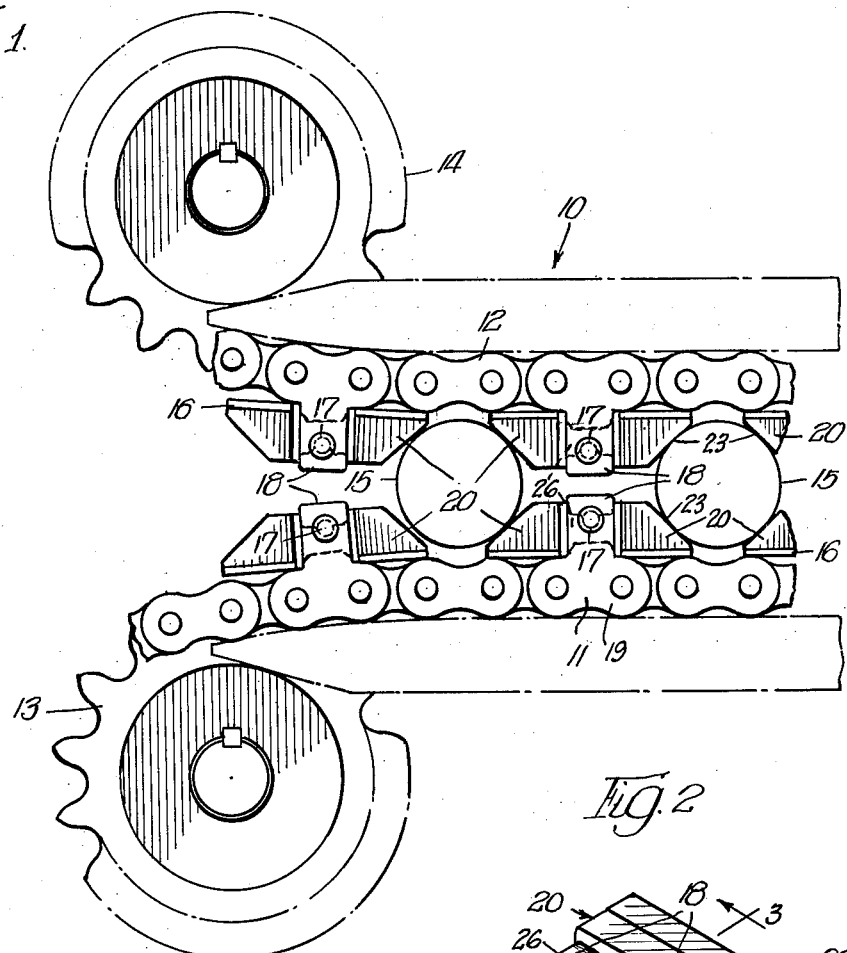
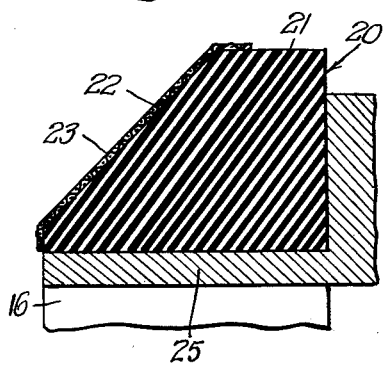
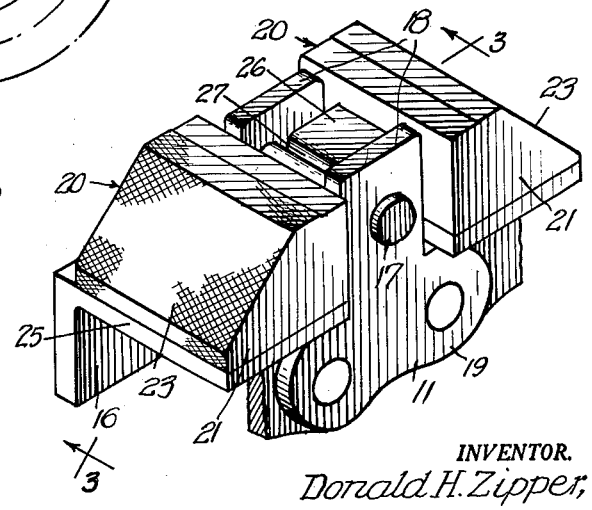
INVENTOR.
Donald H. Zipper,
BY
Cromwell, Greist & Warden
Attys United States Patent Office 3,108,682
Patented Oct. 29, 1963

3,108,682
GLASS JAR GRIPPERS
Donald H. Zipper, Elmhurst, Ill., assignor to Continental Can Company, Inc., New York, N.Y., a corporation of New York
Filed Feb. 16, 1961, Ser. No. 89,874
6 Claims. (Cl. 198—162)

This application relates to container handling apparatus and is more particularly concerned with improvements in gripper structures for use in handling jars, bottles or similar glass containers.

In certain machinery which is designed for handling glass containers, such as, for example, machines for applying screw-on or twist-on closure caps to glass jars, it is necessary to firmly grip the container while applying the closure. Frequently the closure applying operation involves moving the container into a moisture filled chamber where the exterior surface of the container becomes wet or the glass container may be delivered to the closure applying machine in an initially wet condition so that it is difficult to grip. Gripper structures have heretofore been employed for holding the jar while a closure member is applied or while it is subjected to some other processing operation which have been formed, generally of a material such as rubber or the like and pressure has been applied to increase the friction between the surface of the gripper and the glass and thereby increase its effectiveness in gripping the glass. However, most gripper surfaces heretofore employed have had a relatively low coefficient of friction and even with great pressure they have proven inadequate to hold the jar. Also, many manufacturers of glass jars apply a lubricant to the surface, some of which are water insoluble, which increases the difficulty in holding the jar with grippers formed of rubber or like materials. Consequently, previously provided gripper structures have been unsatisfactory and have frequently failed to hold the jar with sufficient firmness while the closure is being applied. It is a general object, therefore, of the present invention to provide a gripper structure for machinery of the type described which provides a more satisfactory gripping surface for glass containers, particularly when they are wet.

It is a more specific object of the invention to provide a gripping surface for a glass container gripper which is effective even though the surface of the glass is wet, the gripper comprising a backing member and a fiber glass facing for engaging with the surface of the glass container.

It is a still more specific object of the invention to provide a glass gripping device which includes a surface forming fiber glass member bonded to a silicone rubber backing member.

It is another object of the invention to provide a glass gripper which includes a resilient backing member and a woven fiber glass cloth member adhered to the glass engaging surface of the backing member.

These and other objects and advantages of the invention will be understood from a consideration of the gripper apparatus which is shown by way of illustration in the accompanying drawings wherein:

FIGURE 1 is a partial plan view of a pair of gripper carrying endless traveling chains which are arranged for operation in a horizontal plane with runs thereof in spaced confronting relation for engaging and clamping glass containers between the grippers while they are advanced with the same;

FIGURE 2 is a perspective view, to an enlarged scale, of one of the gripper members; and FIGURE 3 is a cross section taken on the line 3—3 of FIGURE 2 to an enlarged scale.

Referring to the drawings, there is illustrated a jar gripping apparatus 10 of the type which is adapted to be employed in one form of jar or bottle capping machine and which comprises endless traveling conveyor members having mounted thereon cooperating gripper structures for engaging in gripping relation with glass jars fed between opposed runs of the conveyor members, which gripper structures embody the principles of the present invention.

The illustrated apparatus comprises link chains 11 and 12 which are supported for movement in a closed path and in a horizontal plane on end sprockets 13 and 14. The chains 11 and 12 and the sprockets 13 and 14 are arranged so as to provide parallel runs which are spaced apart a sufficient distance to accommodate successive jars, indicated at 15, between said runs. The jars 15 are supported in vertically disposed relation on the top run of a suitable supporting conveyor (not shown) and fed between the gripper carrying chains. The two chains 11 and 12 carry a series of cooperating gripper brackets 16 which are identical in construction and which are mounted on the chains by means of spaced pivot pins 17, each extending vertically between a pair of ears 18 projecting in vertically spaced relation outboard of the plates 19 of a link on the chain. Each of the gripper brackets 16 carries a pair of gripper members 20 and each gripper member comprises an initially rectangular block of silicone rubber 21 having a corner cut off to form a face 22 extending diagonally relative to the line of travel of the conveyor chain or to the longitudinal face or side of the bracket 16. The diagonal face 22 which is adapted to engage the jar 15 is covered by a fiber glass member in the form of a woven fiber glass cloth 23 which is adhered to the surface 22 of the block 21 by a suitable adhesive or bonding material. Preferably, the bonding material is of a type which is not materially affected by heat and moisture.

Each bracket 16 comprises two angle forming sections 24 with vertically disposed wall forming members 25 which are connected by a bridge-like block forming section 26 with the latter forming a bearing member between the spaced mounting ears 18 on the chain. The bearing block 26 has a pin receiving groove 27 on its innermost face so as to enable the bracket to be detachably connected to the chain by the removable pivot pin 17. Each bracket 16 carries two gripper members 20 with the jar engaging faces 22 extending on opposite sides of the pivoted connection so as to cooperate with the gripper members on the other brackets 16, as shown in FIGURE 1, in engaging and gripping the jars 15. Each gripper member 20 is secured on a supporting wall 25 of its bracket 16 by a suitable fastening means (not shown) preferably of a character which will permit ready removal and replacement of the member.

In the illustrated form of the gripper the backing member on which the fiber glass is applied comprises a block of silicone rubber. Other backing materials having sufficient resiliency may be employed with the fiber glass being adhered or bonded to the surface by an appropriate adhesive. Also, the fiber glass may be employed with a gripper in the form of a traveling belt which is adapted to engage with the surface of a glass container, as for example, in the cap sealing apparatus disclosed in White Patent No. 2,041,891, dated May 26, 1936.

The fiber glass surface on the gripper is not affected by moisture and provides high friction engagement with the surface of the glass container due, it is believed, to the equal hardness of the fiber glass and the glass in the jar. The glass-on-glass engagement between the gripper and the jar is effective to hold the jar, even when the surface is wet, without any tendency to damage the glass by scratching or the like, while at the same time it provides a more effective gripping action than a material having less hardness than the glass in the container.

While particular materials and specific details of construction have been referred to in describing the apparatus illustrated in the drawings, it will be understood that equivalent materials and structural details may be resorted to within the spirit of the invention.

I claim:

1. A gripper member for frictionally engaging and holding a glass container, said gripper member comprising a backing member of rubber-like material and a woven fiber glass covering sheet secured on the outer surface of said backing member which is adapted to engage with the glass surface of the container so as to provide glass-on-glass gripping engagement.

2. A gripping device for engaging in clamping relation with the glass surface of a glass article comprising a backing member of resilient material having an article engaging surface and a fiber glass covering material on said surface having a hardness approximating that of the glass surface which is engaged thereby.

3. A gripper member adapted to cooperate with one or more like members in engaging the glass surface of a glass container so as to clamp and hold the container, said gripper member comprising a rigid bracket, a pad of resilient material on said bracket, said pad having a container engaging face and a woven fiber glass sheet secured on said container engaging face whereby to provide a glass-on-glass engagement when said face is engaged with the glass surface of the container.

4. A gripping device for clamping a glass article by engaging the glass surface thereof, said device comprising a backing member of synthetic rubber material having substantial resiliency and provided with an article engaging surface and a fiber glass facing member on said article engaging surface, which facing member has a hardness approximating that of the glass surface which is engaged thereby.

5. A gripper member adapted to cooperate with one or more like members in clamping and holding a glass article by engaging in clamping relation the glass surface of the article, said gripper member comprising a rigid bracket, a backing pad of resilient material detachably mounted on said bracket and having an article engaging face, and a covering sheet of fiber glass secured on the article engaging face of said pad which covering sheet provides glass-on-glass engagement when said face is engaged with the glass surface of the article.

6. A gripping device for clamping an article having a glass surface, said device comprising a backing member of natural rubber material having substantial resiliency and provided with a surface for engaging the glass surface of the article and a fiber glass facing member on said glass engaging surface, which facing member has a hardness approximating that of the glass surface which it engages.

References Cited in the file of this patent
UNITED STATES PATENTS

| | | |
|---|---|---|
| 805,736 | Lindgren | Nov. 28, 1905 |
| 2,288,612 | De Wyk | July 7, 1942 |
| 2,360,257 | Muller | Oct. 10, 1944 |
| 2,455,175 | Hohl | Nov. 30, 1948 |
| 2,679,924 | Powell | June 1, 1954 |
| 2,754,956 | Sommer | July 17, 1956 |